(12) United States Patent
Yu

(10) Patent No.: US 8,917,324 B2
(45) Date of Patent: Dec. 23, 2014

(54) METHOD AND APPARATUS FOR A CAMERA HAVING SIMPLE LENS

(76) Inventor: Jennifer Jinghan Yu, Fremont, CA (US)

( * ) Notice: Subject to any disclaimer, the term of this patent is extended or adjusted under 35 U.S.C. 154(b) by 0 days.

(21) Appl. No.: 13/615,502

(22) Filed: Sep. 13, 2012

(65) Prior Publication Data
US 2014/0071297 A1 Mar. 13, 2014

(51) Int. Cl.
*H04N 17/00* (2006.01)
*H04N 17/02* (2006.01)
*G06T 7/00* (2006.01)
*G06T 5/00* (2006.01)

(52) U.S. Cl.
CPC .............. *G06T 7/0018* (2013.01); *G06T 5/003* (2013.01); *G06T 2207/10024* (2013.01)
USPC ........... 348/175; 348/156; 348/159; 348/180; 348/181; 348/187; 348/202; 348/208.1; 348/208.5; 348/208.6; 348/208.11; 348/211.9; 348/224.1; 348/230.1; 348/231.5; 348/237; 348/241; 348/249; 348/250; 348/351; 348/360; 348/47; 348/49; 348/50; 348/80; 382/106; 382/255; 382/279; 382/317

(58) Field of Classification Search
USPC .................... 348/175, 79, 80, 49, 181, 208.1, 348/208.11, 156, 159, 180, 187, 202, 208.5, 348/208.6, 211.9, 224.1, 230.1, 231.5, 237, 348/241, 249, 250, 351, 360, 47, 50; 382/106, 255, 279, 317
See application file for complete search history.

(56) References Cited

U.S. PATENT DOCUMENTS

| | | | |
|---|---|---|---|
| 6,452,625 B1 * | 9/2002 | Kapitza ........................ | 348/80 |
| 7,691,544 B2 * | 4/2010 | Gardiner et al. ............... | 430/5 |
| 8,441,520 B2 * | 5/2013 | Dahi et al. .................... | 348/47 |
| 2008/0137059 A1 * | 6/2008 | Piestun et al. ............... | 356/4.01 |
| 2010/0295973 A1 * | 11/2010 | Aubuchon et al. ............ | 348/241 |
| 2011/0043648 A1 * | 2/2011 | Albu et al. .................. | 348/208.5 |
| 2011/0050919 A1 * | 3/2011 | Albu et al. .................. | 348/208.6 |
| 2011/0157320 A1 * | 6/2011 | Oyama ......................... | 348/49 |
| 2011/0199492 A1 * | 8/2011 | Kauker et al. ............... | 348/208.1 |
| 2012/0076362 A1 * | 3/2012 | Kane et al. .................. | 382/106 |

* cited by examiner

*Primary Examiner* — Jefferey Harold
*Assistant Examiner* — Mustafizur Rahman
(74) *Attorney, Agent, or Firm* — Frank F. Tian

(57) ABSTRACT

In an image capturing and processing system, a device and method is provided. The lens is made of simple lens with high diffractive materials and known strong color aberrations. The method includes the steps of: calibrating or measuring a Point Spread Function (PSF) for each color components at a set of distances, capturing image data, and calculating the image obtained using a de-convolution method based on the PSF found.

14 Claims, 6 Drawing Sheets

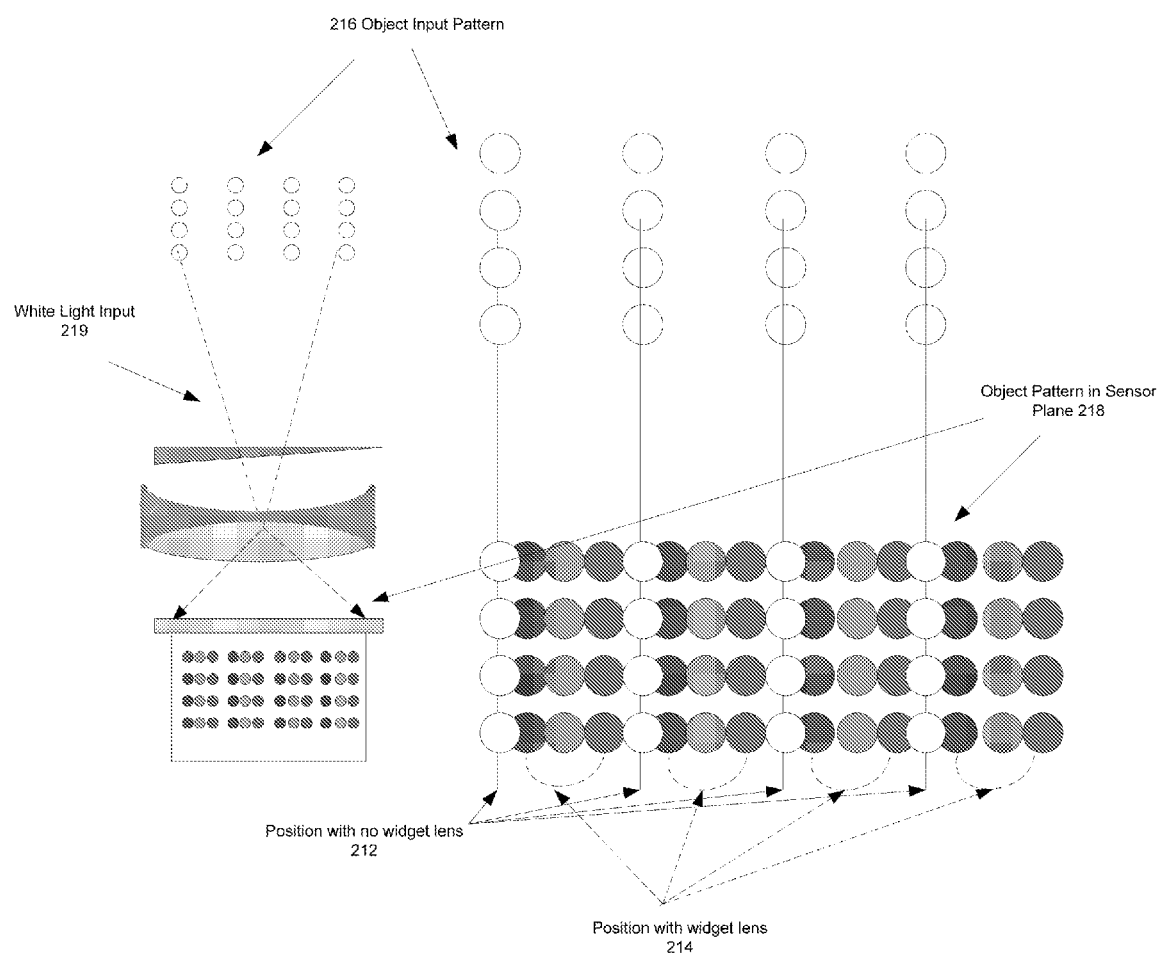

METHOD AND APPARATUS FOR A CAMERA HAVING SIMPLE LENS

FIELD OF THE INVENTION

The present invention relates generally to the image capturing and processing; more specifically the present invention relates to method and apparatus for a camera such as a digital camera having simple lens

BACKGROUND

Lens is the indispensable instrument in such devices as a camera as well as other image capturing instruments. As it is well known, color aberration has been harassing optical engineers and scientists since Newton's Age of some three hundred (300) years ago. Traditionally people have used complicated lenses as a combination or group to fight color aberration in order to get perfect pictures.

It is well known that a lot of glasses of high diffractive indices cannot be simply used alone to reduced the size and weight due the fact that such diffractive indices are wavelength (color) depended. Many complex lenses are designed into the compound lenses to compensate for the chromatic aberration and other artifacts, thereby making the lens heavy, bulky, and expensive. In the current circumstances of rapid development of silicon computation such as GPU and SOC, many aberrations like chromatic aberration can be overcome by the computational power.

Therefore it is desirable to overcome the many aberrations using digital methods and devices rather than heavily using optical ways or devices.

SUMMARY OF THE INVENTION

An image capturing and processing system wherein color aberration can be mitigated and utilized by digital methods rather than optical ways is provided.

An image capturing and processing system wherein simple lens with chromatic aberration in combination with a computational unit being used in the real-time fashion is provided.

An image capturing and processing system wherein a modulation transfer function (MTF) and Point Spread Function (PSF) can be measured in real-time or semi real-time using Multiple Lens and Multiple Sensor apparatus is provided.

An image capturing and processing system, wherein MTF modulation transfer function for each color component is measured and calibrated when the camera is formed and wherein such data are stored inside the camera and can be applied to each and every pixel of the image data, is provided.

An image capturing and processing system wherein a telescope or digital binocular can be designed with controllable chromatic aberration so that the devices are free from elaborate or bulky optic devices such as multiple lens is provided. Alternatively the lens can be made bigger and more powerful. The resultant device can possess increased resolving power even with the same weight.

An image capturing and processing system, wherein a device with a camera such as a mobile handset can be made thinner since the multi-lenses chromatic compensation scheme can be avoided or greatly simplified, is provided. The same working idea can be applied to other aberrations like spherical distortion caused by a device.

An image capturing and processing system wherein a wedge lens is placed in front of the camera to deliberately generate dispersed images is provided.

It is contemplated that a simple lens such as a single lens without elaborate optic processing is used in the present invention. The advantage of the present invention is that the simple lens is structurally combined with electronic signal processing to achieve a result that is comparable with the result of using elaborate optics such as multiple, highly optically manufactured lens.

In an image capturing and processing system, a device and method are provided. The method includes the steps of: calibrating or measuring a Point Spread Function (PSF) for each color components at a set of distances, capturing image data, and based on the PSF found, calculating the image obtained using a de-convolution method.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 2b is the second aspect of FIG. 2a.

Figure 1:
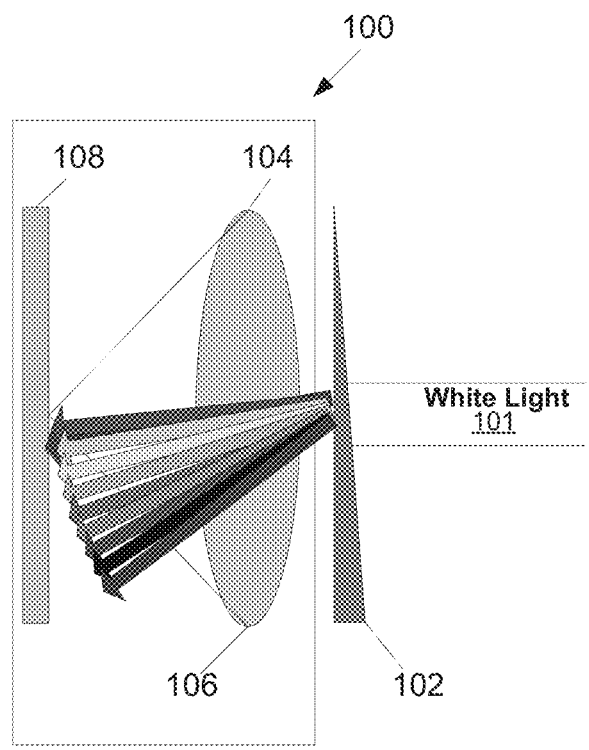
FIG. 1 is the first example of an optic system in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus related to method and apparatus for a camera having simple lens such as a digital camera. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of using a combination of a codec for method and apparatus for a camera having simple lens such as a digital camera described herein. The non-processor circuits may include, but are not limited to, a radio receiver, a radio transmitter, signal drivers, clock circuits, power source circuits, and user input devices. As such, these functions may be interpreted as steps of a method to perform using a codec for method and apparatus for a camera having simple lens such as a digital camera. Alternatively, some or all functions could be implemented by a state machine that has no stored program instructions, or in one or more application specific integrated circuits (ASICs), in which each function or some combinations of certain of the functions are implemented as custom logic. Of course, a combination of two of any above approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Simple Lens is more suitable for the portable electro-optic instruments such as camera, telescope, binocular and microscope. Computation is applied to compensate the aberrations so that final images are free of chromatic and other geometric aberrations while the lenses are kept simple and light even through it has some geometric aberration. It is defined that simple lens is lens free from elaborate or matriculate optical machining or processing. In other words, simple lens has defects, which is corrected by the method and apparatus of the present invention.

Referring again to FIG. 1, for a device 100 such as a camera, subjected to white light 101, a prism lens 102 is used to simulate the effect that a lens 104 has chromatic dispersion 106, i.e. chromatic aberration. The images (not clearly shown) received by the sensors 108 have serious color aberrations and other artifacts (also not shown) as well. The color aberration was typically corrected by known optical ways as people have done to date. This invention shows that such aberration can be mitigated by the digital methods rather than by the optical ways.

As can be seen, the resultant images are all shifted towards the thicker side of the prism due to the diffraction effects of the wedge lens. The shift amount, or the offset, is color or wavelength, distance dependent. It can also be pixel position depend. A special algorithm and data table are needed for each and every pixel and distances to register the offset and thus to compensate the aberration caused. When such mechanism is used for telescope, the offset can be relatively simple since the object's focusing distances are always set at infinity. If the distances are not infinity, the distances need to be measured respectively.

The present invention contemplates intentionally using an optical prism, i.e. wedged lens, being deployed to the optical path of a lens such that some intentional color aberration is created and corresponding computation unit is deployed.

Figure 2A:
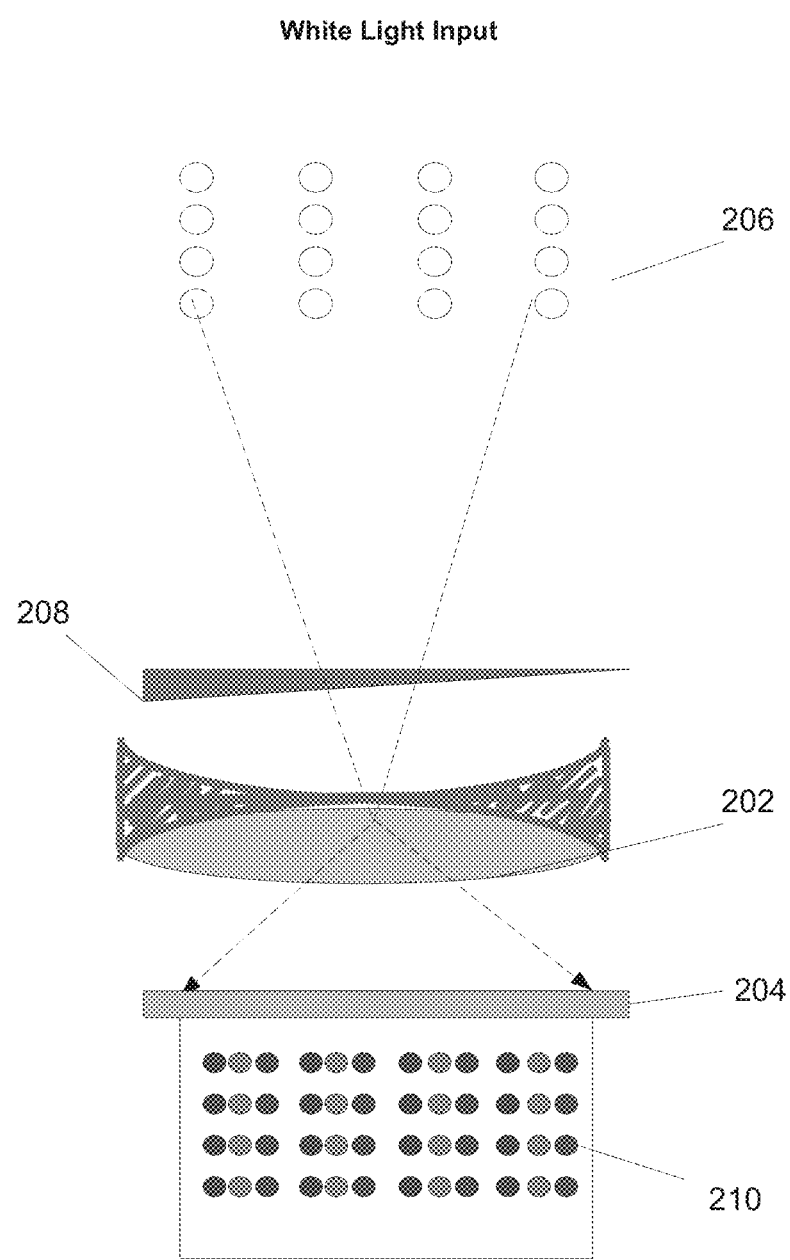
FIG. 2a is the second example of the first aspect of the invention.

Referring again to FIGS. 2a-2b, the second example depicting the present invention is shown. A set of typical black/white dot patterns are used to illustrate the focusing of aberration free lens and chromatic aberration lenses. A lenses 202 and sensors 204 and objects are assumed as black and white dots 206. The images in the sensor 204 should also be the black and white dots if the lenses 202 are ideal. However, when the wedge lens 208 is used such black and white dots will become shifted to the left with a color depended offset 210. A more detailed depiction is shown in FIG. 2b. where a set of typical black/white dot pattern 212 is used to illustrate the focusing of aberration free lens. Whereas, on the other hand, a set of solid dot pattern 214 is used to illustrate the chromatic aberration lenses. In other words, the set of typical black/white dot pattern 212 is used to illustrate a pattern or positions without widget lens 208. Whereas, the set of solid dot pattern 214 is used to illustrate a pattern or positions with widget lens 208. Normally the shorter the wavelength is, the more shifting offset can be observed. Further, an objection input pattern 216 is provided. input pattern 216 is sensed by sensor 204 on an object pattern sensor plane 218.

As can be seen, when the shift amount can be compensated digitally in the R. G and B domain, a perfect picture can be obtained. This shows that simple lens with some chromatic aberration can still be used to produce an aberration-free picture. In other words, simple lens can be used in conjunction with electronic devices to produce the aberration-free picture without elaborate optical device corrections.

The following figures show when the real simple lens is used for image capturing. It may be contemplated that the images of different wavelengths are focused upon different planes.

PSF (Point Spread Function) of different color components shall be derived differently. It is highly related to the transfer function as mentioned before.

Figure 3:
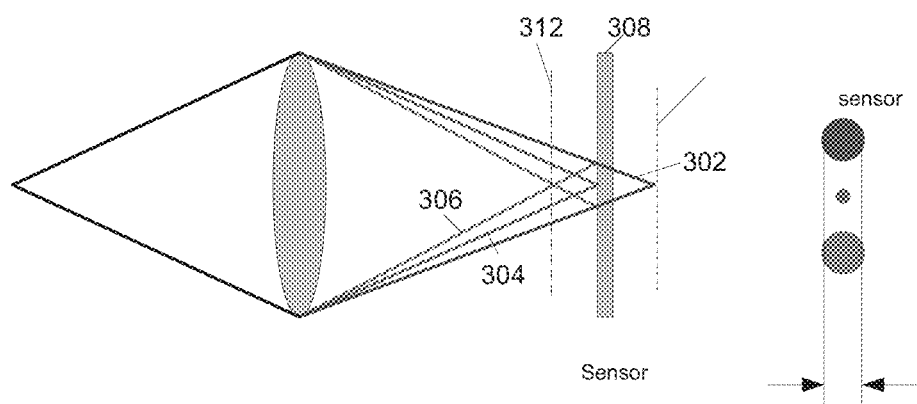
FIG. 3 is an example of the second part of a decoder in accordance with some embodiments of the invention.

Refer to FIG. 3, in which different chromatic components such as red 302, green 304, or blue 306 are focused into different planes, therefore different color components have different transfer functions for one particular plane, i.e. the sensor plane. As can be seen, only green component 304 is focused upon sensor 308 plane. Red component 302 and blue component 306 are respectively focused upon red plane 310 and blue plane 312.

In general, it can be considered that the input signal X goes through a linear function: in Y=H*X where H is the transfer functions, X is the input signal, and Y is output signal. Such transfer function H can be variable functions of the position of each pixel in the sensor. The operation * can be considered as linear convolution.

If the transfer function H and output Y are known, the X can be obtained using reversing filtering or de-convolution method. Such de-convolution algorithms can be Richard-Lucy and Wiener algorithms. This invention differs with other de-convolution based algorithm in that transfer function is known and intentionally designed so that it can be reversely matched.

Normally the transfer function H is a function of not only the color wavelength but also the object's distances to the camera. However, when it is used for the application like telescope and binocular it is simpler, since the distances are always infinity.

When normal camera application is used where the objects distance is not constant and needs to be measured in real-time, a scheme listed in Table 1 can be used to measure the distances and thus the PSF in real-time.

Procedures

TABLE 1

| Steps: | Name | Notes |
| --- | --- | --- |
| 1 | Calibration | Measure the PSF for each color component at every distance that lens can distinguish; note by "every" it is contemplated that a suitable number of value relating to distance are measured or provided via suitable means. |
| 2 | Exposure | The sensors operate to capture the image data; |
| 3 | Measure the distances | Measure the distances based on MLMS(MULTI-LENS, MULTI-SENSOR), if it is known already then skip this step; The distances can also be obtained through other means such as auto-focusing mechanism built-in the camera. |
| 4 | Find the PSF | To find the PSF for each and every pixel based on the distances measured and information stored in the calibration step; If the distances are not accurate enough, go to step 3 to refine the distance measurement; note by "every" it is contemplated that a suitable number of value relating to distance are measured or provided via suitable means. |
| 5 | De-convolution | Calculate the image obtained based on the PSF found |

Figure 4:
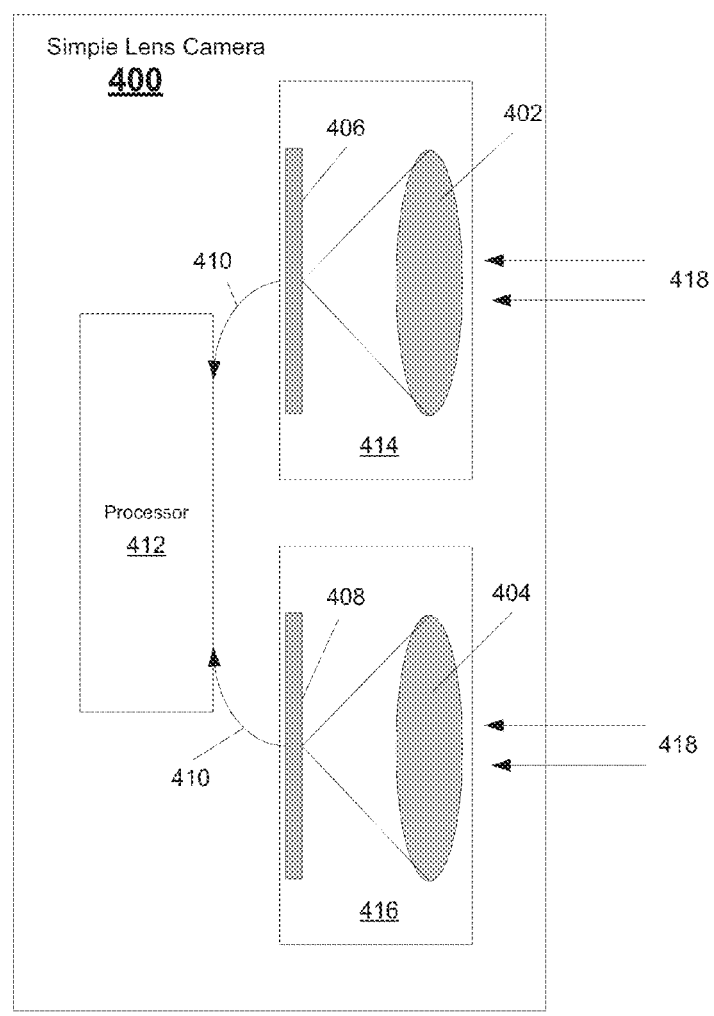
FIG. 4 is an example of a piecewise linear approximation for the structure geometry in accordance with some embodiments of the invention.

In FIG. 4, a simple lens camera 400 is shown. Multiple lens (only two shown) i.e. lens 402 and lens 404 are shown. Each lens, i.e. lens 402 and lens 404, has respectively an associated sensor. In other words, lens 402 has sensor 406 associated therewith and lens 404 has sensor 408 associated therewith. The known imperfect sensed optic information 410 sensed by sensor 406 and sensor 408 respectively are fed to a processor 412, wherein the known imperfections are corrected. The known imperfections include chromatic aberration as well as other aberrations like spherical distortion. Processor 412 stores data relating to the known imperfections down to every pixel. Processor 412 processes in real-time or semi real-time optic information sensed by sensor 406 and sensor 408 respectively. Lens 402 has sensor 406 may be disposed within a housing 414. Similarly, lens 404 has sensor 408 may be disposed within a housing 416. In addition, lens 402 and lens 404 receive optic information 418 respectively.

Figure 5:
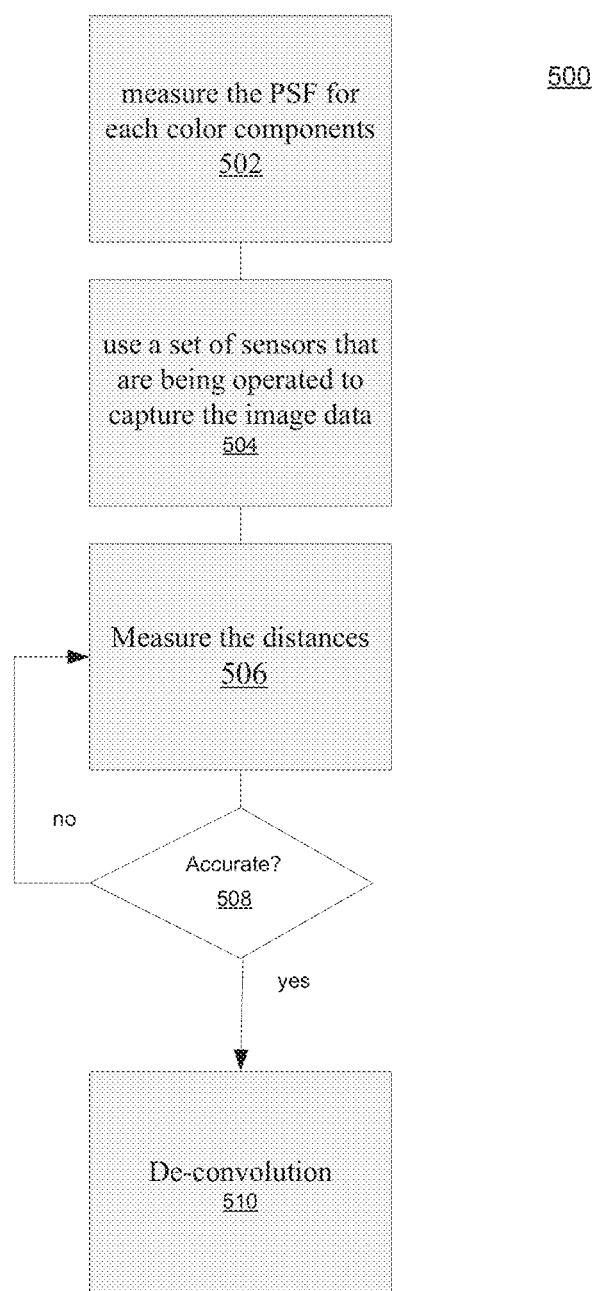
FIG. 5 is an example of a flowchart in accordance with some embodiments of the invention.

In FIG. 5, a flowchart 500 depicts a method for processing optic information using a combination of simple lens and a processor. The calibration step is to measure the PSF for each color component at every distance among a set of distances that lens can distinguish. It is noted that by "every" it is contemplated that a suitable number of values relating to distance are measured or provided via suitable means (Step 502). The exposure step is to use a set of sensors that are being operated to capture the image data (Step 504). Measure the distances based on MLMS (MULTI-LENS, MULTI-SENSOR) as disclosed in U.S. Pat. No. 6,611,289 to Yu, et al entitled "DIGITAL CAMERAS USING MULTIPLE SENSORS WITH MULTIPLE LENSES", which is hereby incorporated herein by reference. If the distance is known already, skip the measuring step. The distances can also be obtained through other means such as auto-focusing mechanism built in the camera (Step 506). To find the PSF for each and every pixel based on the distances measured and information stored in the calibration step. If the distances are not accurate enough, go to step 506 to refine the distance measurement; note by "every" it is contemplated that a suitable number of values relating to distance are measured or provided via suitable means (Step 508). De-convolution is based on the PSF found to calculate the image obtained (Step 510).

It is noted that the lens of the present invention is made of simple lens with high diffractive materials and known strong color aberrations.

It is further noted that the present invention contemplates an electronic image capturing and processing apparatus that have simple lens which is made of high diffractive materials. Further, the apparatus possesses known, strong chromatic aberrations as compared with normal lens having minimizing chromatic aberration.

It is still further noted that the present invention contemplates an apparatus and method that can be used as part of a telescope or a binocular that the objects subjected to processing or measurement are at infinite distance.

It is yet still further noted that the present invention contemplates an apparatus and method can be used as part of a microscope or the likes that the objects are at near distance. In other words, the objects subjected to processing or measurement is at finite distance in sufficient close proximity to the microscope lens or the likes.

In the foregoing specification, specific embodiments of the present invention have been described. However, one ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional", "traditional", "normal", "standard", and terms of similar meaning should not be construed as limiting the item described to a given time period or to an item available as of a given time, but instead should be read to encompass conventional, traditional, normal, or standard technologies that may be available now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

What is claimed is:

1. In an electronic image capturing and processing apparatus having a processing method therein, the method comprising the steps of:
  providing a plurality of simple lens;
  providing a plurality of sensors;
  measuring a set of distances in real time;
  calibrating or measuring at least two Point Spread Functions (PSFs) for each color components at the set of distances;
  capturing image data, wherein the capturing step uses at least two sensors; and
  based on the PSF found, calculating the image obtained using a de-convolution method.

2. The method of claim 1, further comprising the step of refining the distance measurement if a measurement of a distance of the set of distances is not accurate enough.

3. The method of claim 1 further comprising the step of finding the PSF for each and every pixel based on the distances measured and information stored in the calibration step.

4. The method of claim 1 further comprising the step of providing at least one simple lens formed out of high diffractive material.

5. The method of claim 1 wherein an object subjected to measurement is focused at an infinite distance.

6. The method of claim 1 wherein an object subjected to measurement is focused at a finite distance in sufficient close proximity to the electronic image capturing and processing apparatus.

7. The method of claim 1 further comprising the step of providing an optical prism intentionally deployed to an optical path of a lens for creating intentional color aberration.

8. In an electronic image capturing and processing apparatus comprising:
   a plurality of simple lens, wherein at least two sensors are used to capture image data; and a plurality of sensors coupled to the plurality of simple lens; wherein at least two Point Spread Functions (PSFs) for each color components at a set of distances in real time are calibrated or measured, and wherein based on the PSF found, the image obtained is calculated using a de-convolution method.

9. The apparatus of claim 8, wherein the apparatus refines the distance measurement if a measurement of a distance of the set of distances is not accurate enough.

10. The apparatus of claim 8, wherein the apparatus finds the PSF for each and every pixel based on the distances measured and information stored as a result of the calibration.

11. The apparatus of claim 8, wherein at least one of the simple lens are formed out of high diffractive material.

12. The apparatus of claim 8, wherein an object subjected to measurement is focused at an infinite distance.

13. The apparatus of claim 8, wherein an object subjected to measurement is focused at a finite distance in sufficient close proximity to the electronic image capturing and processing apparatus.

14. The apparatus of claim 8, further comprising an optical prism intentionally deployed to an optical path of a lens for creating intentional color aberration.

* * * * *